(12) United States Patent
Piirainen

(10) Patent No.: US 7,031,419 B2
(45) Date of Patent: Apr. 18, 2006

(54) DATA TRANSMISSION METHOD AND SYSTEM

(75) Inventor: Olli Piirainen, Oulu (FI)

(73) Assignee: Nokia Corporation, Espoo (FI)

( * ) Notice: Subject to any disclaimer, the term of this patent is extended or adjusted under 35 U.S.C. 154(b) by 729 days.

(21) Appl. No.: 09/893,735

(22) Filed: Jun. 29, 2001

(65) Prior Publication Data

US 2003/0012318 A1    Jan. 16, 2003

(51) Int. Cl.
*H04L 7/00* (2006.01)

(52) U.S. Cl. ............ 375/358; 375/267; 375/219; 370/335; 370/349; 370/394

(58) Field of Classification Search ............ 375/358, 375/267, 219; 370/335, 394, 349
See application file for complete search history.

(56) References Cited

U.S. PATENT DOCUMENTS

| 5,657,325 | A | 8/1997 | Lou et al. |
| 6,567,388 | B1* | 5/2003 | Tomcik et al. ............ 370/335 |
| 6,728,307 | B1* | 4/2004 | Derryberry et al. ......... 375/219 |
| 2002/0012337 | A1* | 1/2002 | Schmidl et al. ............ 370/349 |
| 2002/0141414 | A1* | 10/2002 | Rezaiifar et al. ........... 370/394 |
| 2003/0026348 | A1* | 2/2003 | Llang et al. ............... 375/267 |

FOREIGN PATENT DOCUMENTS

EP     0 736 979 A    10/1996

WO     WO 99/14871    3/1999

OTHER PUBLICATIONS

Tarokh et al., "Space-Time Block Codes from Orthogonal Designs," IEEE Transactions on Information Theory, vol. 45, No. 5, Jul. 1999, pp. 1456-1467.
Sandhu et al., "Space-Time Block Codes: A Capacity Perspective," IEEE Communications Letters, vol. 4, No. 12, Dec. 2000, pp. 384-386.
Foschini, "Layered Space-Time Architecture for Wireless Communication in a Fading Environment When Using Multi-Element Antennas," Lucent Technologies, Inc., Bell Labs Technical Journal, Autumn 1996, pp. 41-59.

* cited by examiner

*Primary Examiner*—Stephen Chin
*Assistant Examiner*—Eva Zheng
(74) *Attorney, Agent, or Firm*—Pillsbury Winthrop Shaw Pittman LLP (57) ABSTRACT

The invention relates to a data transmission system between two transceivers, including: dividing the symbols to be transmitted into blocks, the number of which is divisible by the number of transmitting antennas; transmitting one block using each antenna; receiving the blocks using one or more antennas; checking whether the blocks were received successfully; and, if the reception of the blocks failed, storing the received blocks in memory; retransmitting the same blocks in a predetermined format; receiving the retransmitted blocks and combining them with the blocks in memory, the predetermined format being selected in the method so that the blocks transmitted first and the retransmitted blocks form space-time block coding.

12 Claims, 5 Drawing Sheets

DATA TRANSMISSION METHOD AND SYSTEM

FIELD OF THE INVENTION

The invention relates to data transmission between two transceivers. In particular, the invention relates to a solution where more than one antenna is used for transmitting and receiving signals in at least one transceiver.

BACKGROUND OF THE INVENTION

Nowadays telephone systems are not only used for transmitting conventional calls but also for offering a plurality of other services. New service concepts are designed constantly, in particular for radio telephone systems. These services are favoured by the users because most users always carry a mobile phone and thus the services are available all the time.

Different services require different transmission capacities from the radio connection. One of the most important research projects in the field of wireless telecommunication systems is how to increase the data transmission capacity over the radio connection. Various methods have been proposed to improve the capacity of existing radio systems and new systems as much as possible. However, each method has its own advantages and disadvantages.

An obvious method of increasing the data rate is to use a higher order modulation method. A disadvantage of such methods is, however, that in order to function properly they require a good signal-to-noise ratio. Secondly, in TDMA systems, in particular, the structure of the equalizer needed in the system becomes complex. The radio frequency parts of base stations and terminals typically generate non-linearity in a signal. Since interference is also generated in the signal, it is difficult to achieve a good signal-to-noise ratio.

Another alternative is to use diversity in signal transmission. Diversity allows improvement of the signal-to-noise ratio of a signal received in a receiver, which increases the average data rate. Prior art transmission diversity methods include delay diversity where the signal is transmitted twice, the latter transmission being delayed. This solution is, however, clearly suboptimal.

Diversity is achieved better by space-time block coding (STBC), which provides the full advantage of diversity. The space-time block code is described e.g. in Tarokh, V., Jafarkhani, H., Calderbank, A. R.: *Space-Time Block Codes from Orthogonal Designs,* IEEE Transactions on information theory, Vol. 45, pp. 1456–1467, July 1999, and in WO 99/14871, which are incorporated herein by reference.

The above-mentioned patent discloses a diversity method where the symbols to be transmitted, which consist of bits, are coded in blocks with a given length and each block is coded into a given number of channel symbols for transmission via two antennas. A different signal is transmitted via each antenna. For example, when the symbols to be coded are divided into blocks with a length of two symbols, the channel symbols to be transmitted are formed so that the channel symbols to be transmitted via a first antenna consist of the first symbol and the complex conjugate of the second symbol, and the channel symbols to be transmitted via the second antenna consists of the second symbol and the complex conjugate of the first symbol.

The STBC method functions well when there is only one antenna at the receiving end. If there are several antennas both at the transmitting and the receiving end, the STBC is suboptimal. As regards this, reference is made to S. Sandhu, A. Paulraj: *Space Time Block Codes: A Capacity Perspective,* IEEE Communications letters, Vol 4, No. 12, December 2000, which is incorporated herein by reference.

A yet another prior art method is to use several antennas or antenna arrays both in transmission and in reception. This is known as the MIMO method (Multiple Input Multiple Output). It has been suggested that the MIMO method yields better results than the methods described above. The MIMO is described in greater detail in G. J. Foschini, *Layered Space-Time Architecture for Wireless Communication in a Fading Environment when Using Multi-Element Antennas,* Bell Labs Technical Journal, Autumn 1996, which is incorporated herein by reference. A good capacity can be achieved by the MIMO, provided that the terminal of the radio system also comprises at least two antennas. Another disadvantage is that the MIMO functions well only if the signals transmitted and received via different antennas travel via different channels. This means that there should be hardly any correlation between the channels. If the channels correlate, the advantage obtained by the MIMO is minimal.

BRIEF DESCRIPTION OF THE INVENTION

The object of the invention is to provide a method and an apparatus implementing the method to achieve a good transmission capacity on a wireless connection. This is achieved with a data transmission method between two transceivers, comprising: using more than one antenna for transmitting and receiving a signal at least in one transceiver; dividing in the first transceiver the symbols to be transmitted into blocks, the number of which is divisible by the number of transmitting antennas; transmitting one block using each antenna; receiving the blocks in the second transceiver using one or more antennas; checking in the second receiver whether all blocks were received successfully; transmitting an acknowledgement to the first transceiver; and, if the reception of the blocks failed, storing the blocks in memory in the second transceiver; retransmitting the same blocks from the first transceiver in a predetermined format; receiving the retransmitted blocks in the second transceiver using one or more antennas and combining them with the blocks in memory, the predetermined format being selected in the method so that the blocks transmitted first and the retransmitted blocks form space-time block coding.

The invention also relates to a data transmission method between two transceivers, comprising: a) using more than one antenna for receiving and transmitting a signal in at least one transceiver; b) dividing in the first transceiver the symbols to be transmitted into blocks, the number of which is divisible by the number of transmitting antennas; c) multiplying the blocks by coefficients describing a time-space block code to obtain at least two sets of blocks; d) transmitting a first set of blocks using one antenna for each block; e) receiving the blocks in the second transceiver using one or more antennas; f) checking in the second transceiver whether the blocks were received successfully; g) transmitting an acknowledgement to the first transceiver; and, if the reception of blocks failed, i) storing the blocks in memory in the second transceiver j) transmitting the next space-time block coded blocks from the first transceiver; k) receiving the retransmitted blocks in the second transceiver using one or more antennas and performing space-time decoding on the retransmitted blocks and the blocks in memory; and if the blocks transmitted first were received successfully, moving to step b).

The invention also relates to a data transmission system comprising a first and a second transceiver, and further comprising means for dividing in the first transceiver the symbols to be transmitted into blocks, the number of which equals the number of transmitting antennas; means for transmitting one block using each antenna in the first transceiver; one or more antennas in the second transceiver for receiving the blocks; means in the second transceiver for checking whether the blocks were received successfully; means in the second transceiver for transmitting an acknowledgement to the first transceiver; means in the second transceiver for storing the blocks in memory; means in the first transceiver for selecting the format for the same blocks so that when the blocks transmitted first are combined with the retransmitted blocks, the coding of the combined blocks forms a space-time block code, means in the first transceiver for retransmitting the same blocks; means in the second transceiver for combining the blocks transmitted first with the retransmitted blocks.

The preferred embodiments of the invention are disclosed in the dependent claims.

The invention is based on new kind of utilization of both the MIMO and the space-time block coding, if necessary. The solution according to the invention provides several advantages. A good transmission capacity is achieved without unnecessarily wasting the band. The efficient STBC transmission is used only when needed, and at other times one employs the MIMO transmission, which provides a good transmission ratio.

In the preferred embodiment of the invention, a signal is divided into blocks and transmitted using more than one antenna. An error check is conducted in the receiver to find out whether the reception succeeded. If it did, a positive acknowledgement is transmitted to the transmitter, which then transmits the next blocks. If the reception failed, the blocks are stored in memory and a negative acknowledgement is transmitted. In that case the transmitter codes the same blocks for retransmission so that a greater diversity than with the originally transmitted blocks is achieved in the receiver when the retransmitted blocks are combined with the blocks the reception of which failed earlier and when the combined blocks are decoded. This coding is preferably performed so that the combined blocks form a space-time block coded signal.

Thus the best aspects of both the MIMO and the STBC can be utilized. If the MIMO channels are sufficiently non-correlating, the first blocks can be decoded successfully in the receiver and no retransmission is needed. This yields a better transmission capacity than pure STBC transmission. On the other hand, if the channels correlate too much, the MIMO is not efficient enough and decoding fails, but a good signal-to-noise ratio can be achieved with the STBC coding because the STBC does not require non-correlating channels.

In the solution according to the preferred embodiments of the invention, data transmission adapts automatically to a changing channel. When the channel is good, the transmission rate is high since no capacity is unnecessarily wasted on diversity. If the channel is poor, retransmission is used. The coding included in retransmission enables noise immune transmission as the diversity increases compared to the case of a good channel.

BRIEF DESCRIPTION OF THE DRAWINGS

The invention will be described in greater detail by means of preferred embodiments with reference to the accompanying drawings, in which.

DETAILED DESCRIPTION OF THE INVENTION

The present invention can be applied in various radio systems where a terminal is provided with different radio path features. It is irrelevant which multiple access method the system employs. For example, the WCDMA, OFDM and TDMA can be used as the multiple access method. The preferred embodiments of the invention can preferably be applied on packet-switched connections. The solutions according to the preferred embodiments of the invention can be applied e.g. in the UMTS and EDGE systems.

Figure 1:
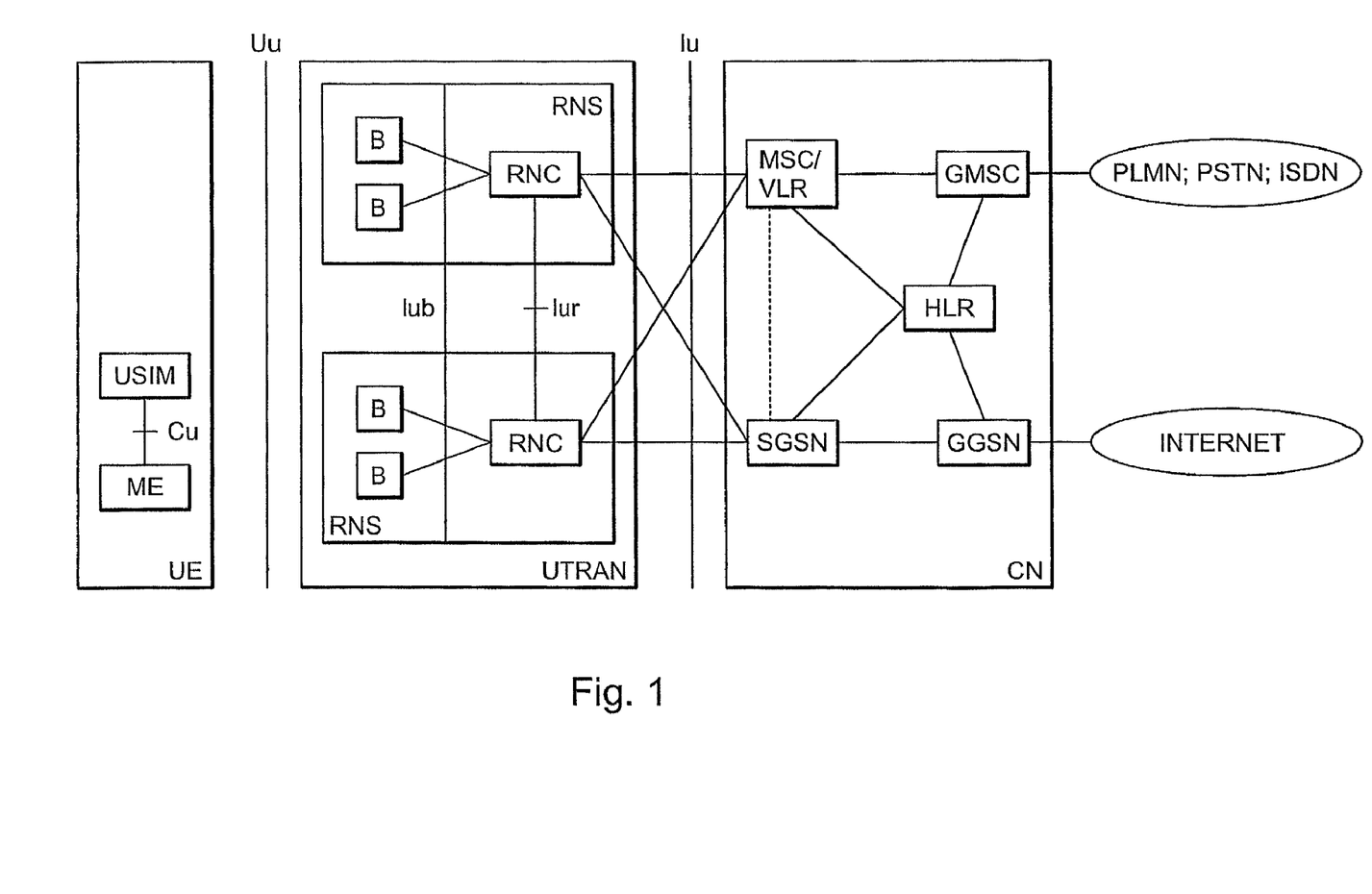
FIG. 1 illustrates the structure of the telecommunications systems used as an example.

The structure of the UMTS mobile communication system, which is used as an example of a system in which the preferred embodiments of the invention can be applied, is described by means of an example with reference to FIG. 1. The EDGE system, for example, essentially comprises the network components that perform corresponding functions, although the terms used for them may differ from those employed below.

The main parts of the mobile communication system are a core network CN, a terrestrial radio access network UTRAN (UMTS terrestrial radio access network) of the mobile communication system and user equipment UE. The interface between the core network CN and the radio access network UTRAN is called Iu and the interface between the UTRAN and the UE is known as Uu.

The subscriber terminal UE consists of two parts: mobile equipment ME comprises a radio terminal which is used for establishing a radio connection over the Uu interface. A UMTS subscriber identity module USIM is a smart card including information on the subscriber's identity. It typically runs identification algorithms and stores encryption parameters and subscriber data.

The UTRAN consists of radio network subsystems RNS. An RNS consists of a radio network controller RNC and one or more B nodes. In practice, a B node refers to a base station. The radio network controller RNC manages the radio resources of the base stations connected thereto.

The core network CN consists of several parts. A home location register HLR is a database in the subscriber's home system maintaining the user's service profile. The home location register also maintains information on the user's location with the accuracy of an MSC. A mobile services switching centre/visitor location register MSC/VLR consists of a switch (MSC) and a database (VLR), which provides circuit-switched services (CS) for the subscriber terminal. The MSC switches circuit-switched services and the VLR maintains information on the user profile and location. A gateway MSC (GMSC) is a switch which connects the UMTS to external services or networks. All circuit-switched connections pass through the GMSC. The functionality of an SGSN (Serving GPRS (General Packet Radio Service) Support Node) corresponds to that of the MSCNLR, but packet-switched (PS) connections pass through it. Correspondingly, the functionality of a GGSN (Gateway GPRS Support Node)

corresponds to that of the GMSC, except that in respect of packet-switched connections only. External networks can be divided into two types: circuit-switched networks, such as the existing telephone networks, and packet-switched networks, such as the Internet.

The UMTS comprises several pre-defined interfaces. There is a Cu interface between the smart card USIM and the mobile station ME. The Uu is a radio interface between the terminal and the base station. The interface between the core network CN and the radio access network UTRAN is called Iu. The interface between the radio network subsystems RNS is known as Iur. This enables soft handovers between radio network controllers produced by different manufacturers. The interface between the radio network controller RNC and the base station B is called Iub.

Figure 2:
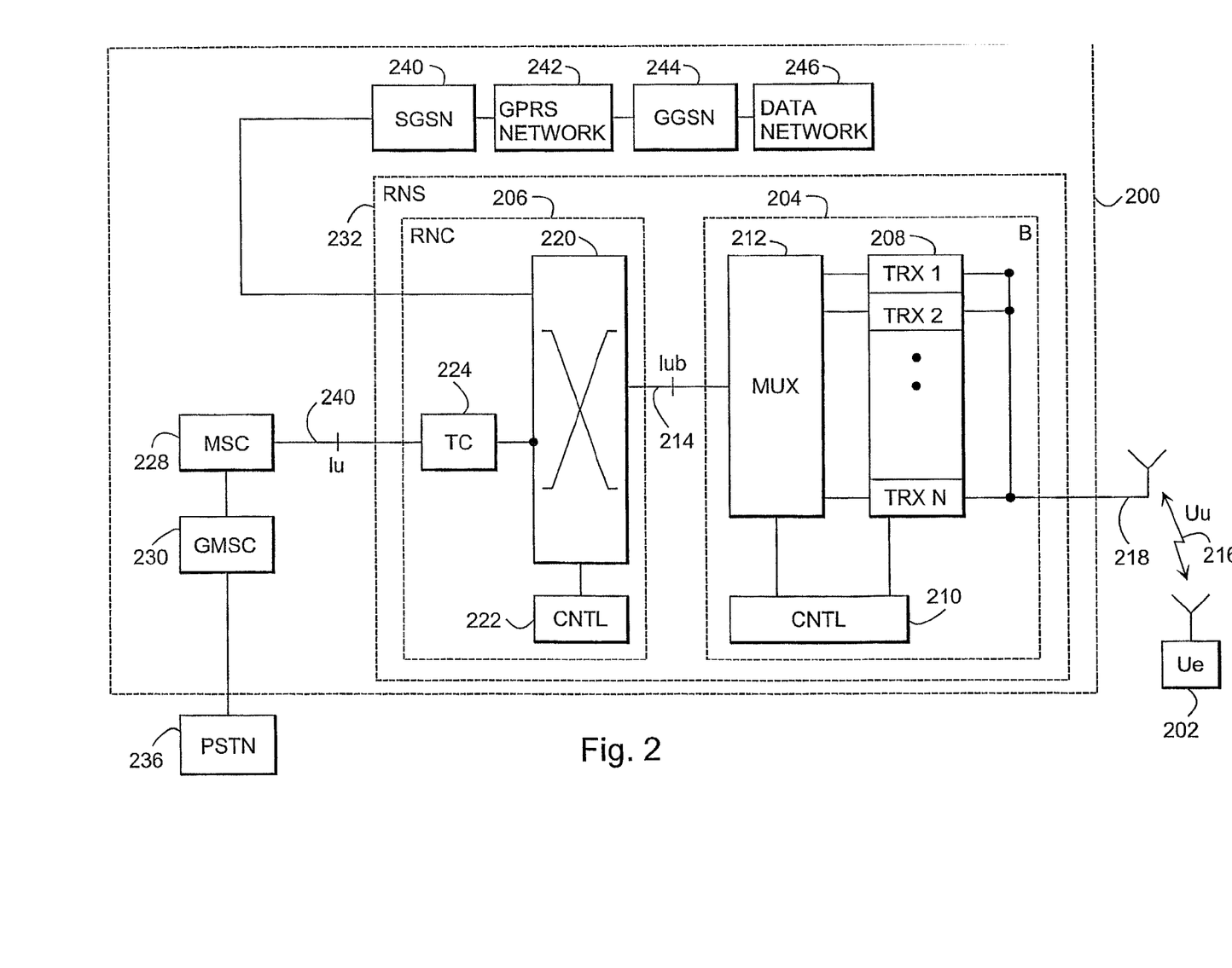
FIG. 2 illustrates in greater detail the structure of the mobile communication system used as an example.

The illustration in FIG. 1 is rather general, for which reason it will be clarified with a more detailed example of the cellular radio system in FIG. 2. FIG. 2 includes only the most essential blocks, but it is clear to a person skilled in the art that a conventional cellular radio network also comprises other functions and structures that need not be discussed more closely in this context. It should also be noted that FIG. 2 shows only one feasible structure. In systems according to the invention the details may differ from those shown in FIG. 2, but these differences are irrelevant to the invention.

The cellular radio network typically comprises the infrastructure of a fixed network, i.e. a network part 200 and subscriber terminals 202, which can be fixed, placed in a vehicle or portable. The network part 200 comprises base stations 204. The base station corresponds to the B node in the preceding figure. Several base stations 204 are controlled centrally by a base station controller 206 which communicates with the base stations. The base station 204 comprises transceivers 208 and a multiplexer unit 212.

The base station 204 further comprises a control unit 210 which controls the function of the transceivers 208 and the multiplexer 212. The multiplexer 212 is used for arranging the traffic and control channels used by several transceivers 208 on one transmission connection 214. The transmission connection 214 forms an interface called Iub.

From the transceivers 208 of the base station 204 there is a connection to an antenna unit 218, which establishes a bi-directional radio connection 216 to the subscriber terminal 202. The structure of the frames to be transmitted on the bi-directional radio connection 216 is system-specific, and called an air interface Uu. In the preferred embodiments of the invention at least part of a signal is transmitted using three or more transmitting antennas or three or more beams formed by several transmission antennas.

The radio network controller 206 comprises a group switching field 220 and a control unit 222. The group switching field 220 is used for switching speech and data and for connecting signalling circuits. A radio network subsystem 232 formed by the base station 204 and the radio network controller 206 also includes a transcoder 224. The transcoder 224 is usually located as close to a mobile services switching centre 228 as possible because this saves transmission capacity when speech is transmitted in the format of a cellular radio network between the transcoder 224 and the radio network controller 206.

The transcoder 224 converts the different digital speech encoding formats used between the public switched telephone network and the radio telephone network into a compatible format, e.g. from the format of the fixed network into a format of the cellular radio network, and vice versa. The controller unit 222 is responsible for call controlling, mobility management, collection of statistics and signalling.

As seen in FIG. 2, the group switching field 220 can establish connections both to the public switched telephone network (PSTN) 236 via the mobile services switching centre 228 and to the packet transmission network 242.

The connection between the packet transmission network 242 and the group switching field 220 is established by a support node 240 (SGSN=Serving GPRS Support Node). The function of the support node 240 is to transmit packets between the base station system and a gateway node (GGSN=Gateway GPRS Support Node) 244 and keep a record of the location of the subscriber terminal 202 in its area.

The gateway node 244 connects a public packet transmission network 246 and the packet transmission network 242. An Internet protocol or an X.25 protocol can be used at the interface. The gateway node 244 hides the internal structure of the packet transmission network 242 from the public packet transmission network 246 by encapsulating the structure, and thus the public packet transmission network 246 regards the packet transmission network 242 as a sub-network which comprises a subscriber terminal 202 to which the public packet transmission network can send packets and receive packets from it.

The packet transmission network 242 is typically a private network which utilizes the Internet protocol and carries signalling and tunnelled user data. The structure of the network 242 may vary according to the operator in respect of its architecture and protocols below the Internet protocol layer.

The public packet transmission network 246 may be e.g. the worldwide Internet network.

Time slots not involved in circuit-switched transmission are typically used for packet transmission at the air interface 216. The capacity is reserved dynamically for packet transmission, i.e. as a data transmission request is received, any free channel can be allocated to packet transmission. The arrangement is flexible, which means that circuit-switched connections have priority over packet transmission connections. If necessary, circuit-switched transmission overrides packet-switched transmission, i.e. the time slot used by packet-switched transmission is allocated to circuit-switched transmission. This can be done because packet-switched transmission withstands such interruptions well: transmission is continued using another allocated time slot. The arrangement can also be implemented so that no absolute priority is given to circuit-switched transmission but both circuit-switched and packet-switched transmission requests are served in their order of arrival. These arrangements are not, however, relevant to the present invention.

In the following, space-time block coding will be exemplified by a case where two transmission antennas are used. Coding can be described by means of the following equation:

$$y = \begin{pmatrix} A_1 & B_1 \\ A_2 & B_2 \end{pmatrix} * \begin{pmatrix} \text{real}(x_1) \\ \text{real}(x_2) \\ \text{imag}(x_1) \\ \text{imag}(x_2) \end{pmatrix} \quad (1)$$

Here $x_1$ and $x_2$ represent the symbols to be transmitted and real (x) and imag (x) refer to the real and imaginary parts of x. Matrices $A_i$ and $B_i$, i=1,2 define space-time block coding. Vector y comprises transmissions to be transmitted by two antennas. Signal z, as seen by the receiver, can be written as follows:

$$z = (H_1 H_2)^* y$$

and the signals from several antennas are combined. Here $H_1$ and $H_2$ represent the transmission channel. It can be noted here that if the matrices $A_i$ and $B_i$ are unit matrices, transmission occurs via two antennas without coding. If there are zeros on the main diagonal of the matrices $A_i$ and $B_i$ and ones on some other diagonals, we obtain the delay diversity.

It has been shown (e.g. in Tarokh, V. et al cited above) that full diversity is obtained if the matrices $A_i$ and $B_i$ fulfil the following conditions:

$$A_i A_k^* = -A_k A_j^* ja \; B_i B_k = -B_k B_j$$

$$A_i A_i^* = I \; ja \; B_i B_i^* = I \quad (2)$$

$$A_i B_k = B_k A_i$$

where i, j and k represent possible different indices.

Figure 3:
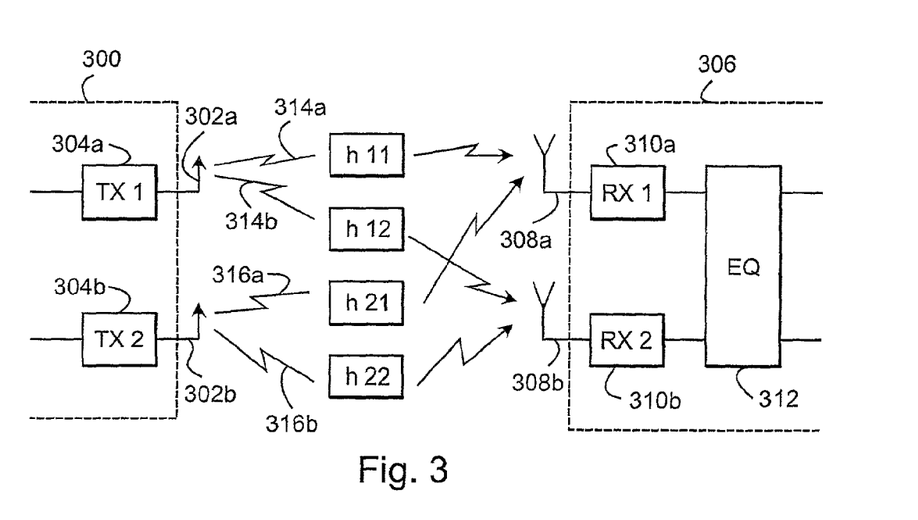
FIG. 3 illustrates an example of MIMO data transmission.

Examine FIG. 3, which shows an example of MIMO data transmission. The figure illustrates a transmitter 300, which may be a base station of the radio system, for example. The transmitter comprises two antennas 302a, 302b for transmitting a signal. The signal to be transmitted to the antennas arrives from transmitter units 304a, 304b. The receiver 306 may be a terminal of the radio system, for example. The receiver comprises two antennas 308a, 308b for receiving the signal. The signal transmitted from the antennas 302a, 302b of the transmitter 300 propagates at least along four different routes 314a, 314b, 316a, 316b to the antennas 308a, 308b of the receiver. The channel model of these routes can be marked with h11, h12, h21 and h22. The receiver further comprises an equalizer 312 where the symbols received from different antennas are combined and decoded.

In the following, the preferred embodiments of the invention will be described by a case where the transceivers at both ends of the radio path have two antennas available. It should be remembered that this is only one example and the number of antennas can vary. As regards the invention, it is only necessary that one transceiver, preferably the one that transmits the signal, comprise two antennas. The base station equipment can be easily provided with an antenna array, but it is easier to implement a terminal using one antenna, or at most two.

The preferred embodiments of the invention employ 'incremental redundancy', which is going to be introduced into the EDGE system. In packet transmission, a first transceiver typically transmits packets to a second transceiver. Convolution coding is performed first on the packet to be transmitted and the encoded bits are divided into three blocks, for example. At the beginning, the first transceiver transmits only the first block to the second transceiver. The first block includes the bits for finding out the content of the whole packet in decoding if the signal-to-noise ratio is good enough.

The second transceiver checks whether the block was received successfully, and transmits a positive (ACK) or a negative (NACK) acknowledgement to the transmitter. In the case of successful reception the packet can be supplied to further processing. After unsuccessful reception the block the reception of which failed is temporarily stored in memory. Having received a negative acknowledgement the first transceiver transmits the second block of the packet. In that case the second transceiver combines both the packets together. This provides coding stronger than that of the first block for decoding. If decoding still fails, the first transceiver is requested to transmit the next block.

Figure 4:
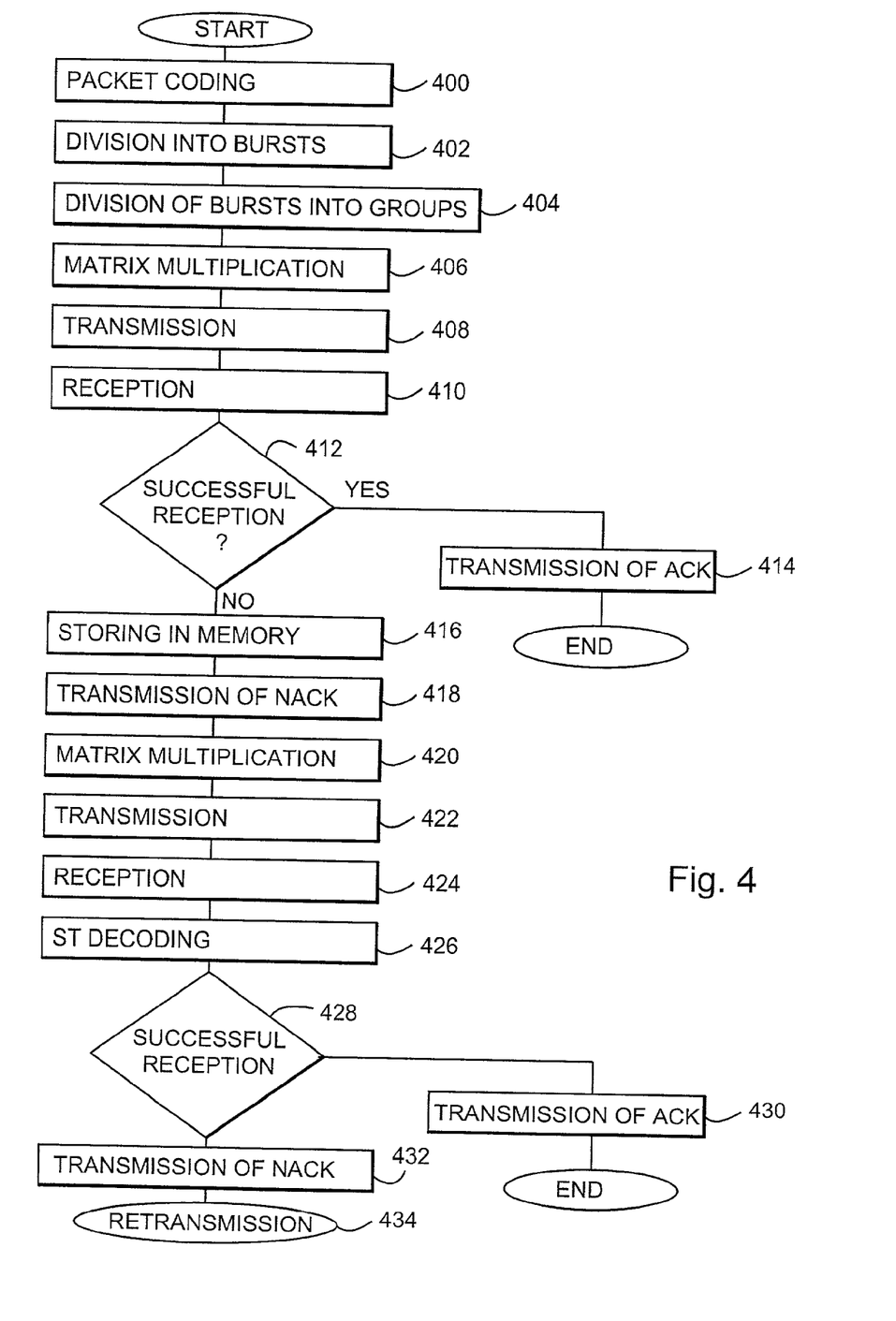
FIG. 4 is a flow chart illustrating the solution according to a preferred embodiment of the invention.

A solution according to a preferred embodiment of the invention will be described by means of the flow chart illustrated in FIG. 4. The information packet to be transmitted is encoded in the first transceiver and divided into different blocks in step 400, as explained above. In step 402 the block to be transmitted is divided into separate bursts. The number of bursts is divisible by the number of antennas used in transmission, let the number be $n_T$. Next, in step 404, the bursts are divided into $n_T$ groups which are multiplied by the matrices $A_1$ and $B_1$ according to formula (1) in step 406. Each group is transmitted from an antenna of its own in step 408.

In step 410 the second transceiver receives the bursts and checks in step 412 whether the reception succeeded. If it did, the second transceiver transmits a positive acknowledgement to the first transceiver in step 414.

It should be noted that several groups may be transmitted before transmitting an acknowledgement.

If the reception failed, the second transceiver stores the bursts temporarily in memory in step 416 and transmits a negative acknowledgement to the first transceiver in step 418. Next, in step 420, the same nT bursts are multiplied by the matrices $A_1$ and $B_1$ according to formula (1). The groups are transmitted in step 422.

In step 424 the second transceiver receives the bursts and in step 426 reads the stored bursts from memory and performs space-time block decoding. In step 428 the second transceiver checks whether the reception succeeded. If it did, the second transceiver transmits a positive acknowledgement to the first transceiver in step 430.

If the reception failed, the second transceiver transmits a negative acknowledgement to the first transceiver in step 432. Next 434 the same bursts are transmitted again according to step 404.

After all the groups have been transmitted multiplied by the matrices A and B, we can move to transmit the second block of step 400 and continue the procedure until the whole data packet has been transmitted successfully.

In a preferred embodiment of the invention the matrix multiplications of both step 406 and step 420 are carried out in step 406 and the blocks multiplied for retransmission are kept in memory till step 420, if any.

As described above, the space-time block coding employed in the preferred embodiments of the invention differs from original space-time block coding in that the transmission channel may have changed between the transmission and the retransmission. When two transmitting antennas and one receiving antenna are used, the matrices $H_1$ and $H_2$ of formula (1) are replaced with four matrices $H_{11}$, $H_{12}$, $H_{21}$, $H_{22}$. Formula (1) will read as follows:

$$z = \begin{pmatrix} H_{11} & 0 & H_{21} & 0 \\ 0 & H_{12} & 0 & H_{22} \end{pmatrix} \begin{pmatrix} A_1 & B_1 \\ A_2 & B_2 \end{pmatrix} * \begin{pmatrix} \text{real}(x_1) \\ \text{real}(x_2) \\ \text{imag}(x_1) \\ \text{imag}(x_2) \end{pmatrix} \quad (3)$$

When two transmission antennas and two reception antennas are used, the matrices $H_1$ and $H_2$ of formula (1) are replaced with eight matrices $H_{11}$, $H_{12}$, $H_{21}$, $H_{22}$, $H_{31}$, $H_{32}$, $H_{41}$, $H_{42}$. Now formula (1) will read as follows:

$$z = \begin{pmatrix} H_{11} & 0 & H_{21} & 0 \\ 0 & H_{12} & 0 & H_{22} \\ H_{31} & 0 & H_{41} & 0 \\ 0 & H_{32} & 0 & H_{42} \end{pmatrix} \begin{pmatrix} A_1 & B_1 \\ A_2 & B_2 \end{pmatrix} * \begin{pmatrix} \text{real}(x_1) \\ \text{real}(x_2) \\ \text{imag}(x_1) \\ \text{imag}(x_2) \end{pmatrix} \quad (4)$$

Figure 5A:
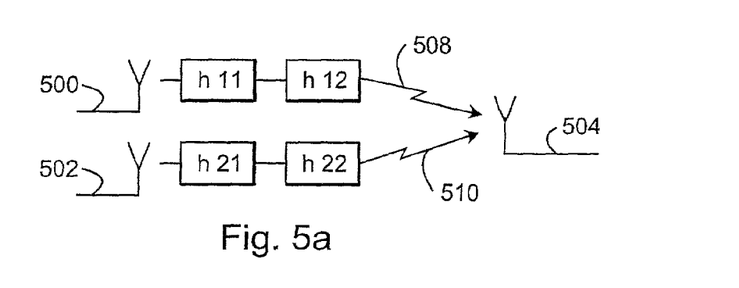
FIGS. 5a and 5b illustrate ST coding.

FIG. 5a illustrates an example of formula (3). The example illustrated in the figure comprises two transmitting antennas 500, 502 and one receiving antenna 504. Between the antennas there are two transmission paths 508 and 510. A first group is transmitted first on the transmission path 508 from the antenna 500 to the antenna 504, the channel being defined by channel coefficient $H_{11}$. At the same moment a second group is transmitted from the antenna 502 along the path 510, the transmission channel being defined by channel coefficient $H_{21}$. If retransmission occurs, the first group is retransmitted from the antenna 500 multiplied by different matrices, the channel being defined by channel coefficient $H_{12}$. At the same moment the second group is retransmitted from the antenna 502 multiplied by different matrices along the path 510, the transmission channel being defined by channel coefficient $H_{22}$.

Figure 5B:
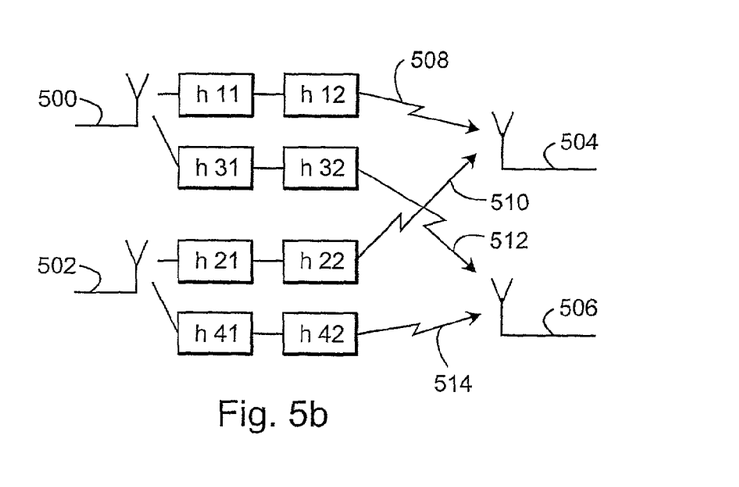

An example of formula (4) is illustrated in FIG. 5b. The example shown in the figure comprises two transmitting antennas 500, 502 and two receiving antennas 504, 508. Between the antennas there are four transmission paths 508 to 514. A first group is transmitted first from the antenna 500. The antenna 504 receives the group from the transmission path 508, the channel being defined by channel coefficient $H_{11}$. The antenna 506 simultaneously receives the group on the transmission path 512, the ch transmitted from the antenna 502. The antenna 506 receives the group along the path 510, the transmission channel being defined by channel coefficient $H_{21}$. The antenna 504 simultaneously receives the same group along the path 514, the transmission channel being defined by channel coefficient $H_{41}$.

If retransmission is required, the first group is retransmitted multiplied by different matrices from the antenna 500. The antenna 504 receives the group from the transmission path 508, the channels being defined by channel coefficient $H_{12}$. The antenna 506 simultaneously received the group on the transmission path 512, the channel being defined by channel coefficient $H_{32}$. At the same moment the second group multiplied by different matrices is re-transmitted from the antenna 502. The antenna 506 receives the group along the path 510, the transmission channel being defined by channel coefficient $H_{22}$. The antenna 504 simultaneously receives the same group along the path 514, the transmission channel being defined by channel coefficient $H_{42}$.

The preferred embodiments of the invention can thus be applied regardless of whether there are one or more receiving antennas. If the number of antennas is two, the MIMO transmission enables a high transmission rate when the signal-to-noise ratio is good. On the other hand, if the signal-to-noise ratio is poor, the coding used in retransmission enables transmission which is immune to noise.

The matrices A and B presented in the above-mentioned formulae (1, 3 and 4) can be selected so that they fulfil the conditions of formula (2). The selection can be made according to the known principles of space-time block coding, which are described in greater detail e.g. in Tarokh, V. et al cited above, and it is therefore unnecessary to explain the selection more closely in this context. As stated above, the space-time block code employed in the preferred embodiments of the invention differs from the original space-time block code in that the transmission channel may have changed between transmission and retransmission. For this reason, the matrices A and B, particularly when frequency hopping is in use, do not necessarily need to fulfil all the conditions given in formula (2) to provide a functioning system. However, if the channels correlate strongly, proper STBC coding provides a good result.

Next we will describe another example of space-time block coding where two transmitting antennas are used. Assume that the symbols to be transmitted are grouped into blocks s1 and s2 containing two symbols. In this embodiment the same blocks are retransmitted, if necessary, from the first transceiver in a pre-determined format to obtain space-time block coding. The coding is determined by a 2×2 matrix:

$$(s1, s2) \Rightarrow \begin{pmatrix} s1 & s2 \\ -s2^* & s1^* \end{pmatrix} \quad (5)$$

In a preferred embodiment of the invention the symbols are first transmitted as such, i.e. s1 and s2 from antennas of their own. If reception succeeds, the next symbols will be transmitted. If reception fails, retransmission will be carried out. Now the same symbols are transmitted as −s2* and s1* in accordance with the 2×2 matrix. Space-time block coding can be performed in the receiver because a space-time block coded symbol group is obtained by combining the symbols transmitted first with the retransmitted symbols.

In other words, the blocks of the original transmission are re-transmitted but in a different format, which has been selected to allow utilization of the properties of the space-time block code in reception. This format is obtained by matrix multiplication, by multiplication by coefficients, or by another suitable calculation or conversion.

Figure 6:
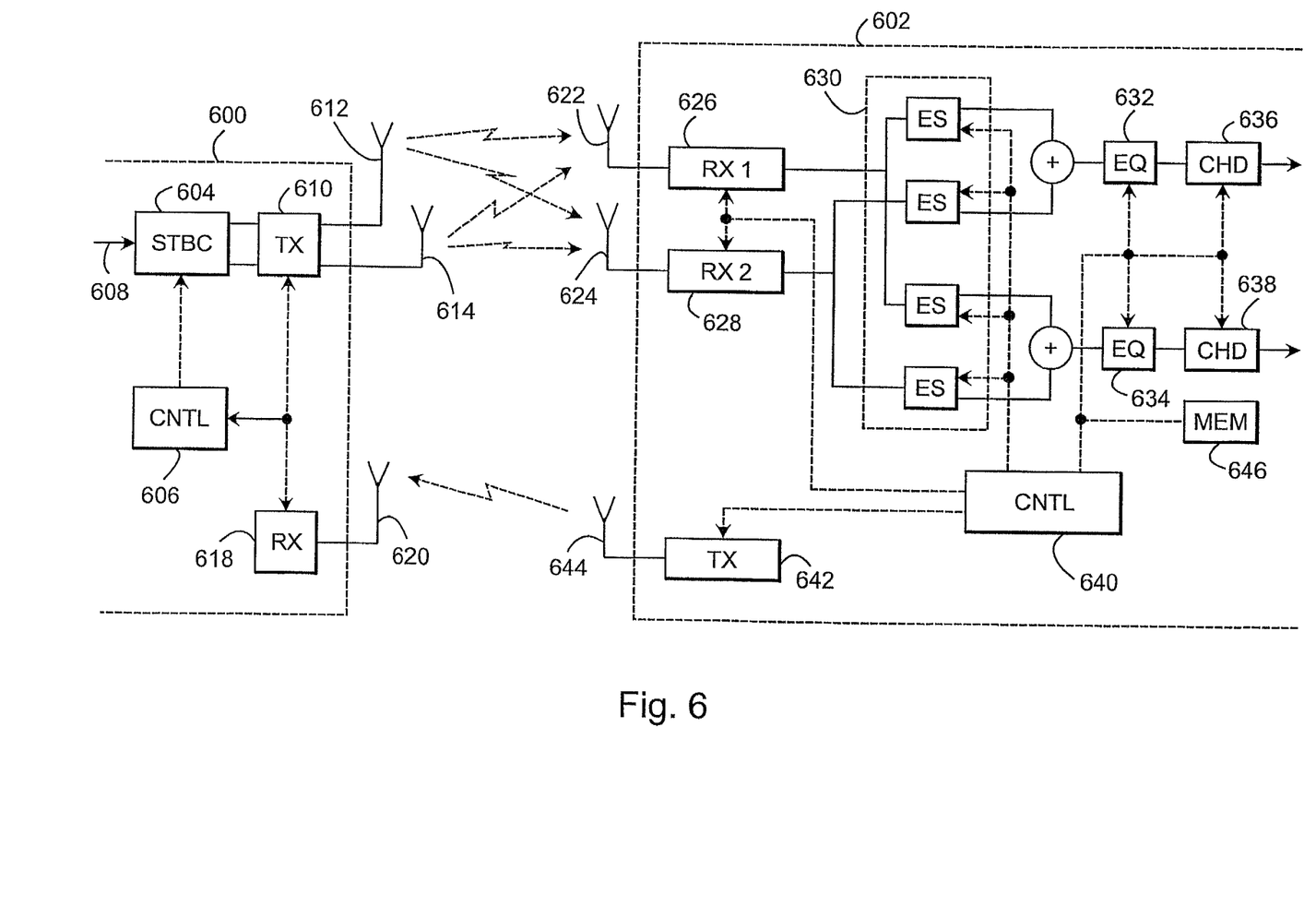
FIG. 6 illustrates an example of the structure of transceivers.

Next we will describe examples of transceivers according to preferred embodiments by means of FIG. 6. The figure shows the parts of the first transceiver 600 and the second transceiver that are relevant to the invention. The transceivers also comprise other components, which is obvious to a person skilled in the art, but they are not described here. The first transceiver comprises a space-time block encoder 604, whose input includes the signal 608 to be transmitted. In the ST encoder the signal is coded and divided into different blocks, which are further divided into separate bursts, the number of which is divisible by the number of antennas used in transmission. In the transceiver used as the example this number is 2. In the ST encoder the bursts are divided into two groups, which are multiplied by the matrices $A_1$ and $B_1$. The multiplied bursts are supplied to radio frequency parts 610, where they are amplified, converted into the radio frequency and transmitted via antennas 612 and 614. A control block 616 controls the operation of the different parts of the first transceiver. The ST encoder 604, like the control block, can be implemented by a processor and suitable software, by separate components or by a combination of a processor and components and suitable software. The radio frequency parts 610 can be implemented according to the prior art.

The first transceiver further comprises receiving parts 618 and a receiving antenna 620. In practice, the same antennas are used as the transmitting antennas and as the receiving antennas in a receiver.

In this example the second transceiver 602 includes two receiving antennas 622, 624 for receiving the transmitted bursts and corresponding radio frequency parts 626, 628 to which the bursts received by the antennas are supplied and in which the bursts are converted into an intermediate frequency or into the baseband. From the radio frequency parts the received signal is supplied to pre-filters 630, where the signals transmitted by different antennas are separated from one another. This can be done in several ways known to a person skilled in the art. One way is to use an interference suppression method where a desired signal is received and the other signals are treated as interference. The purpose of the pre-filters is to eliminate interference and shorten the impulse response of the desired signal.

From the intermediate filters the signals are supplied to equalizers 632, 634, where the signal is further equalized e.g. by a delayed decision feedback sequence estimator DDFSE and by an MAP (maximum a posteriori probability) estimator connected in series with the DDFSE. Equalization and pre-filtering can be based e.g. on minimum mean-square error decision feedback equalization DFE. From the equalizer the signal is supplied to channel decoders 636, 638.

A control block 640 controls the operation of the different parts of the second transceiver. The equalizers 632, 634, like the control block, can be implemented by a processor and suitable software, by separate components, or by a combination of a processor and components and suitable software. The radio frequency parts 626, 628 and the channel decoders 636, 638 can be implemented according to the prior art.

The second transceiver further comprises transmitting parts 642 and a receiving antenna 644. In practice, the same antennas are used as the transmitting antennas and as the receiving antennas in a receiver.

In the second transceiver the channel decoders try to decode the received bursts, and if they do not succeed in this, a negative acknowledgement is transmitted to the first transceiver by the transmitting means 642 and the transmitting antenna 644. The bursts the reception of which failed are stored temporarily in memory 646.

The first transceiver receives the acknowledgement by the antenna 620 and receiving parts 618, and the control means 616 control the ST encoder to make it multiply the same $n_T$ bursts by the matrices $A_2$ and $B_2$ and performs retransmission.

In the second transceiver the channel decoders 636, 638 receive the retransmitted and the received bursts from the equalizers and the bursts received earlier from memory 646. These bursts are space-time block coded in the channel decoder by methods known to a person skilled in the art.

Even though the invention has been described with reference to an example according to the accompanying drawings, it is clear that the invention is not limited thereto, but it can be modified in various ways within the scope of the inventive concept disclosed in the appended claims.

The invention claimed is:

1. A data transmission method between a first transceiver and a second transceiver, comprising:
   using more than one antenna for transmitting and receiving a signal at least in one of the first and second transceivers;
   dividing in the first transceiver the symbols to be transmitted into a set of blocks, the number of blocks in the set being divisible by the number of transmitting antennas;
   transmitting one block using each antenna;
   receiving the blocks in the second transceiver using one or more antennas;
   checking in the second transceiver whether all blocks of the set were received successfully;
   transmitting an acknowledgement to the first transceiver;
   and, if the reception of the blocks of the set failed,
   storing the blocks of the set in memory in the second transceiver;
   retransmitting the same blocks of the set from the first transceiver in a predetermined format;
   receiving the retransmitted blocks in the second transceiver using one or more antennas and combining them with the blocks in memory, and
   selecting the predetermined format so that the blocks in the memory and the retransmitted blocks form space-time block coding.

2. A method according to claim 1, further comprising multiplying each block by a pre-determined matrix before first transmission of the block.

3. A method according to claim 1, wherein space-time block coding is performed on the combined blocks.

4. A data transmission method between a first transceiver and a second transceiver, comprising:
   a) using more than one antenna for receiving and transmitting a signal in at least one of the first and second transceivers;
   b) dividing in the first transceiver the symbols to be transmitted into blocks, the number of which is divisible by the number of transmitting antennas;
   c) multiplying the blocks by coefficients describing a time-space block code to obtain at least two sets of blocks;
   d) transmitting a first set of blocks using one antenna for each block;
   e) receiving the first set of blocks in the second transceiver using one or more antennas;
   f) checking in the second transceiver whether the blocks was received successfully;
   g) transmitting an acknowledgement to the first transceiver;
   and, if the reception of the first set of blocks failed,
   i) storing the first set of blocks in memory in the second transceiver;
   j) transmitting another set of space-time block coded blocks from the first transceiver; and
   k) receiving the other set of blocks in the second transceiver using one or more antennas and performing space-time decoding on the other set of blocks and the blocks in memory; and if the blocks transmitted first were received successfully, proceeding dividing the first transceiver symbols to be transmitted into blocks.

5. A data transmission system comprising a first and a second transceiver, and further comprising
   means for dividing in the first transceiver the symbols to be transmitted into a set of blocks, the number of blocks in the set being equal with the number of transmitting antennas;
   means for transmitting one block using each antenna in the first transceiver;
   one or more antennas in the second transceiver for receiving the set of blocks;
   means in the second transceiver for checking whether the set of blocks was received successfully;
   means in the second transceiver for transmitting an acknowledgement to the first transceiver;
   means in the second transceiver for storing the set of blocks in memory;
   means in the first transceiver for selecting the format for the blocks of the same set so that when the blocks in the memory of the second transceiver are combined with the blocks of selected format, coding of the combined blocks forms a space-time block code;

means in the first transceiver for retransmitting the same blocks of the same set in the selected format; and means in the second transceiver for combining the blocks transmitted first with the retransmitted blocks.

6. A data transmission system according to claim 5, wherein the first transceiver comprises means for performing space-time block coding on the blocks to be transmitted.

7. A data transmission system according to claim 5, wherein the second transceiver comprises means for performing space-time block coding on the blocks received from retransmission and on the blocks retrieved from memory.

8. A data transmission system according to claim 5, wherein the first and the second transceiver are transceivers of a cellular radio system.

9. A data transmission system according to claim 5, wherein the data transmission system is an EDGE system.

10. A data transmission system according to claim 5, wherein the data transmission system is adapted to employ the TDMA as the multiple access method.

11. A data transmission system according to claim 5, wherein the data transmission system is adapted to employ the CDMA as the multiple access method.

12. A data transmission system according to claim 5, wherein the data transmission system is adapted to employ the OFDM as the multiple access method.

* * * * *